United States Patent [19]

Müller

[11] Patent Number: 4,872,361
[45] Date of Patent: Oct. 10, 1989

[54] SHIFT ROD FOR A MANUAL TRANSMISSION

[75] Inventor: Robert Müller, Mönsheim, Fed. Rep. of Germany

[73] Assignee: Dr. Ing. h.c.F. Porsche AG, Weissach, Fed. Rep. of Germany

[21] Appl. No.: 177,927

[22] Filed: Apr. 5, 1988

[30] Foreign Application Priority Data

Apr. 2, 1987 [DE] Fed. Rep. of Germany ....... 3703290

[51] Int. Cl.$^4$ ............................ G05G 9/18; G05G 7/16
[52] U.S. Cl. ................................. 74/473 R; 74/470; 403/79; 403/157; 403/224; 464/87
[58] Field of Search ............. 74/470, 473 R; 403/224, 403/157, 79; 464/87, 92, 112, 180

[56] References Cited

U.S. PATENT DOCUMENTS

| 2,591,769 | 4/1952 | Beechler | 464/101 |
| 2,860,495 | 11/1958 | Stark | 464/87 |
| 3,013,412 | 12/1961 | Millman | 464/87 X |
| 3,550,467 | 12/1970 | Forichon | 74/473 R |
| 4,086,822 | 5/1978 | Kuroda | 74/473 R |

FOREIGN PATENT DOCUMENTS 87569 9/1983 European Pat. Off. .......... 74/473 R

Primary Examiner—Allan D. Herrmann
Attorney, Agent, or Firm—Barnes & Thornburg

[57] ABSTRACT

A shift rod for the manual preselecting and shifting of transmission gears is constructed in two rod segments. The two rod segments are connected with one another by means of a vibration-damping coupling joint. The coupling joint is housed in a damping body that, in longitudinal direction of the shift rod, is developed to be softly resilient over a short distance, but with a subsequent strong spring progression, is developed to be very stiff with respect to torsion in twisting direction of the shift rod.

11 Claims, 2 Drawing Sheets

4,872,361

SHIFT ROD FOR A MANUAL TRANSMISSION

BACKGROUND AND SUMMARY OF THE INVENTION

The invention relates to a shift rod for a manual transmission.

A shift rod of this type that is known from German Published Examined application Ser. No. (DE-AS) 21 65 629 consists of two segments that are connected with one another by means of a fork joint. For uncoupling the fork joint from vibrations, it is equipped with an elastic bush. If this type of a bush is made to be very flexible in order to achieve a good disconnection from the vibrations, the shift rod, as a whole, becomes so flexible that no precise coordination is obtained between the movement of the manual gear shift lever and the position of the shift fork in the transmission.

It is an object of the invention to develop such a shift rod having a damping body in such a way that a good uncoupling from vibrations as well as a precise shifting becomes possible.

This objective is achieved by developing a vibration coupling joint between two shifting rod segments which is softly resilient over a predetermined short distance and stiffly connected thereafter with a very stiff transfer of twisting forces. If the damping body that is inserted into the shift rod, in longitudinal direction of the shift rod, is developed to be softly resilient over a short distance, the vibrations that are introduced into the shift rod by the engine transmission unit are damped effectively. Since subsequently the spring progression of the damping body rises steeply, a quasi-rigid coordination is ensured between the movement of the manual gear shift lever and the shifting movement in the manual transmission so that the transmission gears can be shifted very precisely. In twisting direction of the shift rod, the damping body is developed to be every stiff with respect to torsion so that also for the preselection of the gears, an exact coordination is achieved between the selecting movement of the manual gear shift lever and the preselection position of the respective transmission components.

Other objects, advantages and novel features of the present invention will become apparent from the following detailed description of the invention when considered in conjunction with the accompanying drawings.

DETAILED DESCRIPTION OF THE DRAWINGS

Figure 1:
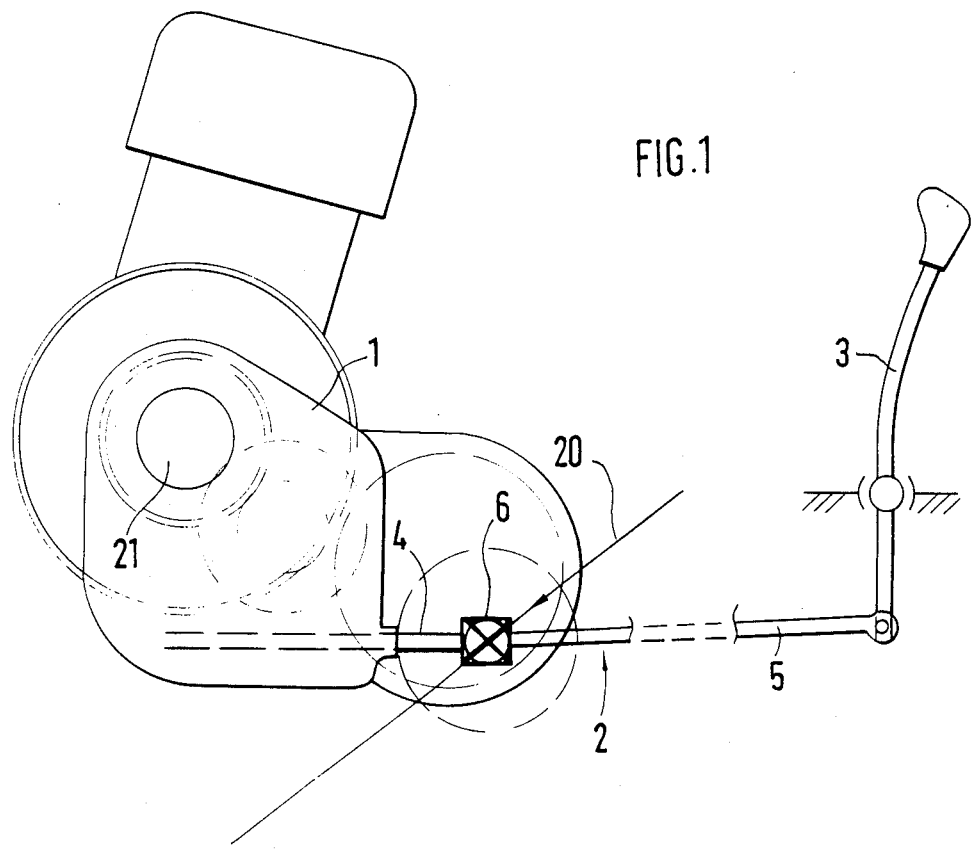
FIG. 1 schematically depicts a shift rod between an engine transmission unit and a manual gear shift lever constructed in accordance with a preferred embodiment of the present invention.
Figure 2:
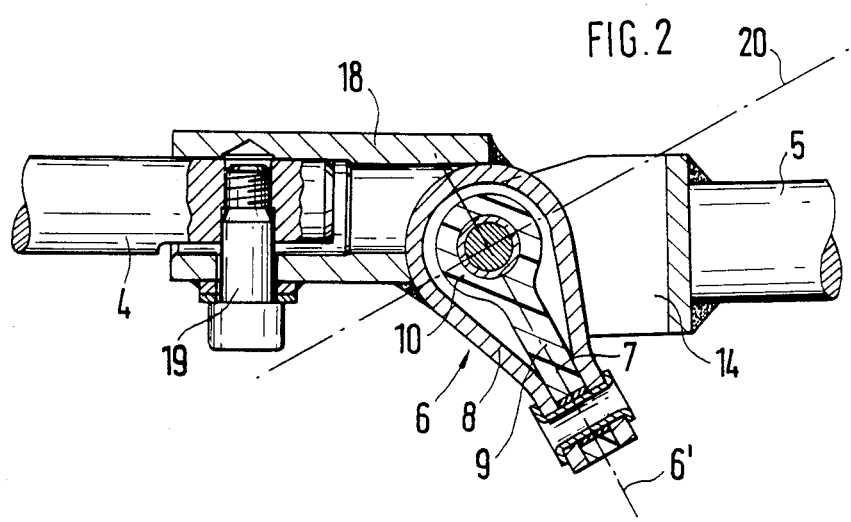
FIG. 2 is a longitudinal enlarged sectional schematic view of the shift rod and the damping body of FIG. 1.
Figure 3:
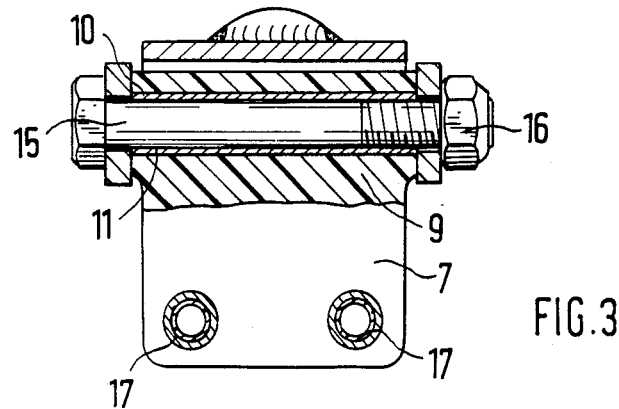
FIG. 3 is a cross-sectional view of the damping body of FIG. 1.
Figure 4:
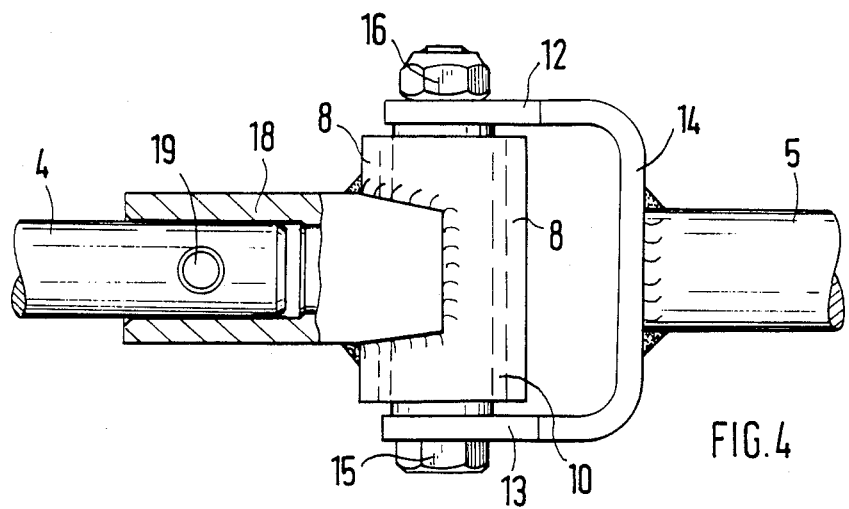
FIG. 4 is a top view of FIG. 2.

A shift rod 2 engages in an engine transmission unit 1 and, with a manual gear shift lever 3, can be twisted for the preselection of the transmission gears, and can be slid longitudinally for the shifting of the transmission gears. The shift rod 2 is composed of two rod segments 4 and 5, and rod segment 4 that engages into the engine transmission unit 1, via a damping body 6, being pivoted at the other rod segment 5 that leads to the manual gear shift lever 3. The damping body 6 consists of a damping plate 7 and a metal plate 8 that is bent around this damping plate 7 as an interlacing means. The damping plate 7 is made of rubber having a textile ply 9 and, at one of its sides, is equipped with a cylindrically thickened joint receiving device 10 that extends over the whole width of the plate.

A metal sleeve 11 is vulcanized into a bore of the joint receiving device 10 that is located in the center with respect to the joint receiving device 10 and in the center with respect to the longitudinal course of the shift rod 2 this metal sleeve 11, at its front faces, is held between the forks 12 and 13 of a fork head 14 that is welded to the rod segment 5. By means of a hexagon cap screw 15 that is screwed through the metal sleeve 11 and the forks 12 and 13 and by means of a screw nut 16, the damping body 6 is pivotally fastened at the rod head 14.

The metal plate 8 is bent around the joint receiving device 10 of the damping plate 7 in such a way that all around it has a radial distance s from it. The two ends of the metal plate 8 are connected with the damping plate 7 flush with its underside by means of a tubular rivet 17. The rod segment 4 that leads to the engine shift lever transmission block 1 is fitted into a sleeve 18 welded to the metal plate 8 and is connected with it by means of a radial tight-fit screw 19.

In the unloaded condition, the damping body 6, because of its softness, allows the absorption of axial vibration and movement amplitudes in the range of several millimeters. As soon as, during a shifting operation, the damping body 6 is loaded by higher axial forces, the housing receiving device of the damping plate 7 comes to rest against the metal plate 8. The resulting effective springs rate provides a good shifting feel. A resulting impaired insulation from vibrations during the shifting process is accepted because the damping body 6, after the manual shift lever 3 is released, automatically adjusts itself again in the central position with a radial gap s on both sides with respect to the metal plate 8. All compensating movements will be carried out by the elastic deformation of the damping plate 7 without any sliding or rolling friction. This results in freedom from maintenance and insensitivity to dirt and corrosion.

The damping body 7 is developed to be very stiff with respect to torsion in order to, by the twisting of the shift rod, be able to carry out the preselection of the transmission gears in a precise way. In a predetermined manner, the stiffness with respect to torsion can be influenced by the dimensioning of a textile reinforcement 9 that is vulcanized into the damping plate 7.

The rod segment 4 at the transmission is exposed to strong vibrations, the direction 20 of their movements extending tangentially with respect to a circle drawn around the engine crankshaft 21 and forming an angle of about 45° with respect to the longitudinal axis of the shift rod 2. These vibrations can be optimally damped according to certain preferred embodiment, if the damping body 6 is arranged at an angle of about 45° with respect to the shift rod 2 in such a way that the longitudinal axis 6' of the damping body 6 is located vertically with respect of the direction 20 of the movement of the vibrations of the engine transmission unit 1.

Figure 5:
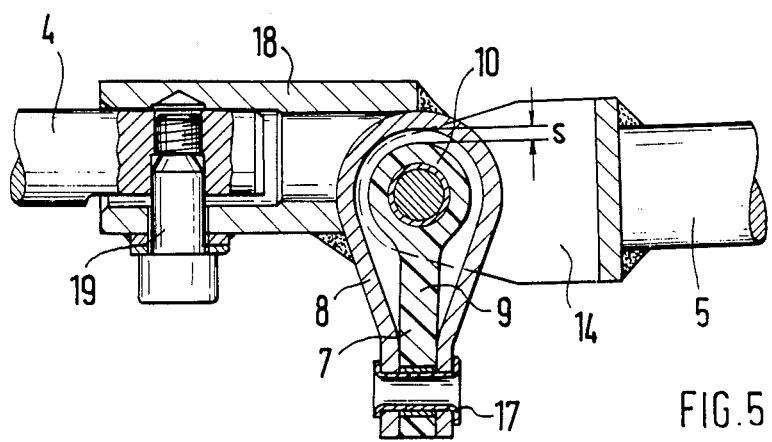
FIG. 5 is a schematic view similar to FIG. 2, showing an alternative embodiment of the coordination between the damping body and the shift rod.

In FIG. 5, it is assumed that the direction of vibration movement extends along the length of the rod segments 4 and 5. In this embodiment the damping body extends at a 90° angle to these rod segments 4, 5.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A shift rod for a gear shift transmission of a motor vehicle of the type that is flanged to an engine unit with the desired transmission gears being manually preselectable and shiftable by means of twisting and longitudinal movements of said shift rod, said shift rod being constructed in two rod segments connected with one another by means of a vibration-damping coupling joint, wherein the coupling joint is housed in a damping body that, in a longitudinal direction of the shift rod, is developed to be softly resilient over a short distance, but that, with a subsequent strong spring progression, is developed to be very stiff with respect to torsion in twisting direction of the shift rod, wherein the damping body comprises a rectangular damping plate and a metal plate that shrouds the damping plate.

2. A shift rod according to claim 1, wherein the damping plate, at one side, has a cylindrically thickened joint receiving device that extends along the width of the plate.

3. A shift rod according to claim 2, wherein the damping body forms an angle of about 45° with respect to the longitudinal axis of the shift rod, so that its longitudinal axis is located vertically with respect to a direction of the movement of the main vibration of the engine transmission unit.

4. A shift rod according to claim 2, wherein the metal plate is bent, in a U-shape, around the joint receiving device 10 with a small radial play (s) and is riveted to the other side of the damping plate.

5. A shift rod according to claim 4 wherein the damping plate is made of one of rubber and elastomer and, in order to provide stiffness with respect to torsion, contains reinforcing elements that are vulcanized therein.

6. A shift rod according to claim 1 wherein the damping plate is made of one of rubber and elastomer and, in order to provide stiffness with respect to torsion, contains reinforcing elements that are vulcanized in.

7. A shift rod according to claim 1, wherein the forked rod head is mounted at one rod segment, and wherein the joint receiving device is held at a front face between two parallel forks of the head and is pivotably screwed together with same by means of hexagonal cap screw serving as a joint shaft.

8. A shift rod according to claim 7, wherein a metal sleeve is vulcanized into a bore of the joint receiving device, the hexagonal cap screw being fitted into said metal sleeve in an easily twistable way.

9. A shift rod according to claim 8, wherein the damping body forms an angle of about 45° with respect to the longitudinal axis of the shift rod, so that its longitudinal axis is located vertically with respect to a direction of the movement of the main vibration of the engine transmission unit.

10. A shift rod according to claim 2, wherein the joint receiving device is spaced vertically with respect to the longitudinal axis of the shift rod.

11. A shift rod for a gear shift transmission of a motor vehicle of the type that is flanged to an engine unit with the desired transmission gears being manually preselectable and shiftable by means of twisting and longitudinal movements of said shift rod, said shift rod being constructed in two rod segments connected with one another by means of a vibration-damping coupling joint, wherein the coupling joint is housed in a damping body that, in a longitudinal direction of the shift rod, is developed to be softly resilient over a short distance, but that, with a subsequent strong spring progression, is developed to be very stiff with respect to torsion in twisting direction of the shift rod, wherein the damping body forms an angle of about 45° with respect to the longitudinal axis of the shift rod, so that its longitudinal axis is located vertically with respect to a direction of the movement of the main vibration of the engine transmission unit.

* * * * *